June 3, 1924.

Re. 15,854

F. L. MARTINDALE

RECORDER

Original Filed Nov. 1, 1915 3 Sheets-Sheet 1

INVENTOR:
Frank L. Martindale

June 3, 1924. Re. 15,854

F. L. MARTINDALE

RECORDER

Original Filed Nov. 1, 1915 3 Sheets-Sheet 2

INVENTOR:
Frank L. Martindale

June 3, 1924. Re. 15,854

F. L. MARTINDALE

RECORDER

Original Filed Nov. 1, 1915 3 Sheets-Sheet 3

INVENTOR:
Frank L. Martindale

Reissued June 3, 1924.

Re. 15,854

UNITED STATES PATENT OFFICE.

FRANK L. MARTINDALE, OF PHILADELPHIA, PENNSYLVANIA.

RECORDER.

Original No. 1,244,113, dated October 23, 1917, Serial No. 58,959, filed November 1, 1915. Application for reissue filed August 27, 1923. Serial No. 659,693.

*To all whom it may concern:*

Be it known that I, FRANK L. MARTINDALE, a citizen of the United States, residing at Philadelphia, in the county of Philadelphia and State of Pennsylvania, have invented a new and useful Recorder, of which the following is a specification.

The present invention relates to a device whereby the summation of a variable quantity may be indicated or recorded, and the principle of its operation, broadly stated, resides in adding to the summation at predetermined intervals amounts equal to the value or rate of the quantity at the particular time. The invention is particularly applicable to meters for measuring the flow of liquids and other fluids and comprises an arm or member arranged to swing or move in a given path at predetermined intervals and a cam controlled by or associated with an element responsive to the varying rate of flow, whereby the amount of movement of the arm is limited to correspond to the rate of flow, together with an indicating, recording or registering device by which the total movement of the arm or member is shown. The invention further consists in the details of construction shown, described and claimed.

Figure 1:
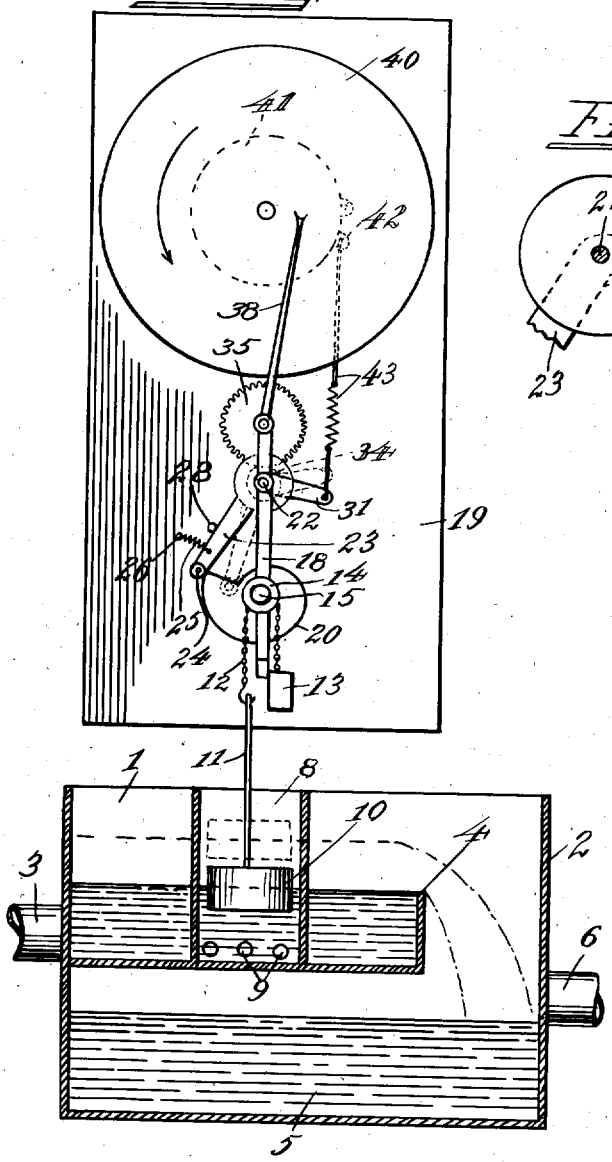
Figure 3:
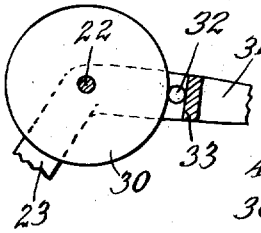
Figure 2:
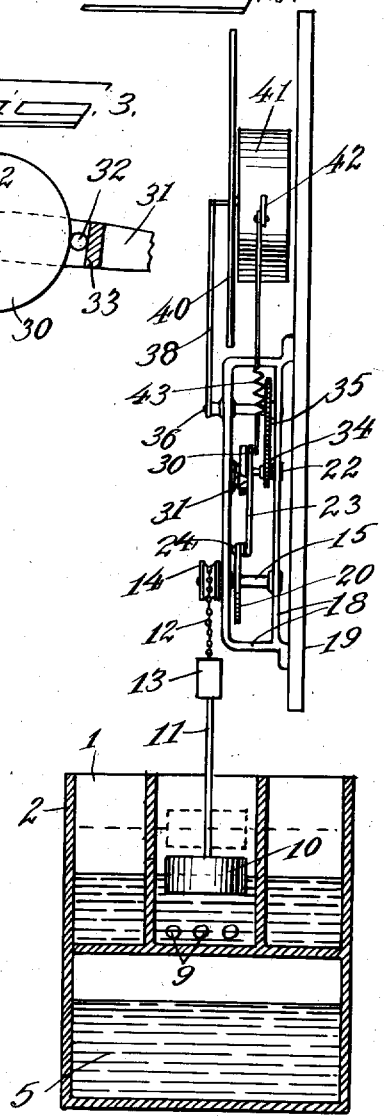
Figure 5:
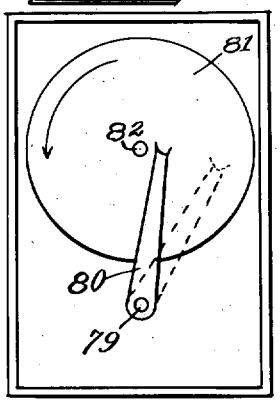
Figure 4:
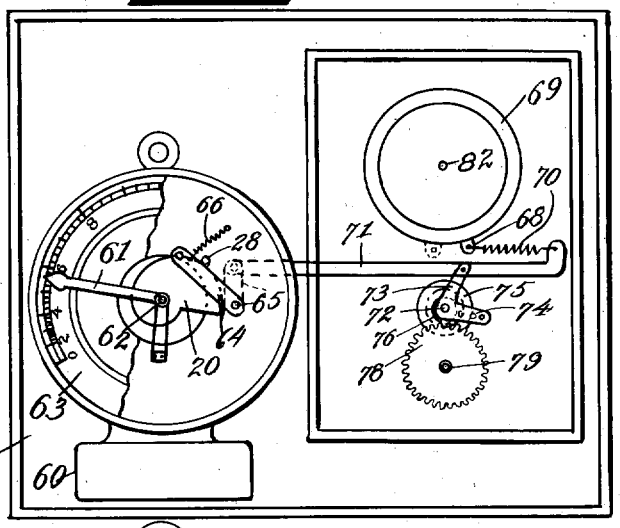
Figure 6:
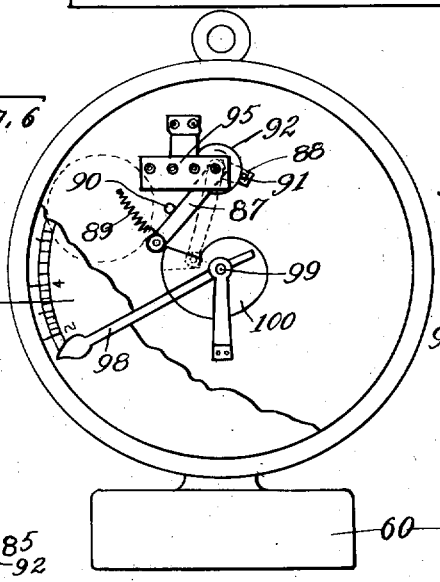
Figure 7:
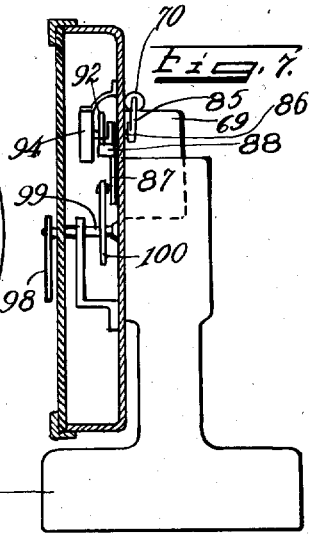
Figure 8:
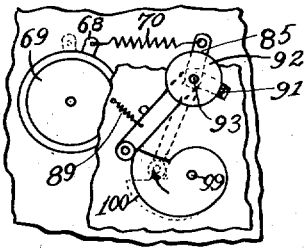
Figure 9:
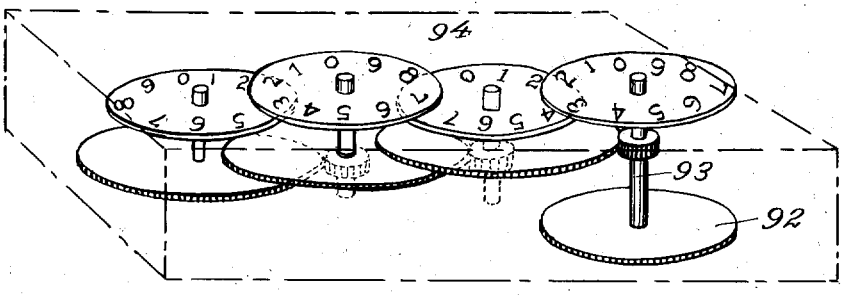
Figure 11:
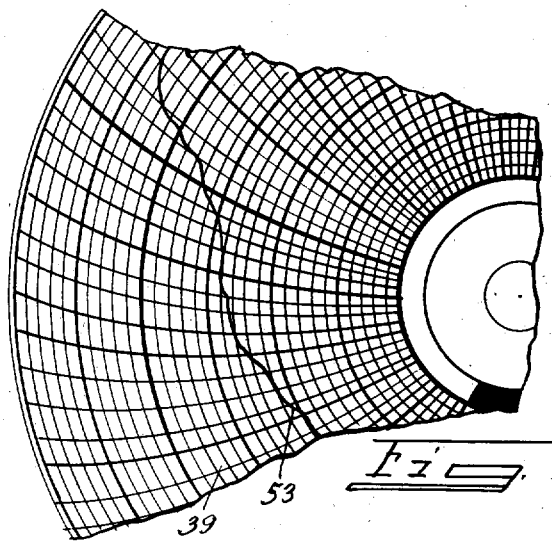
Figure 10:
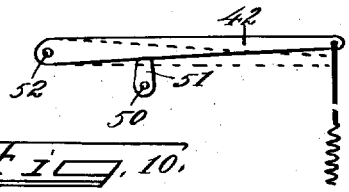

In the drawings, Figure 1 is a part front view, part vertical section through an embodiment of my invention whereby the flow of liquid may be recorded on a dial. Figure 2 is a view at right angles to Figure 1. Figure 3 is a detail of a preferred form of ratchet construction between the time controlled lever and the gears that rotate the pen arm. Figure 4 is a front view showing the invention applied to a steam or gas flow meter, the dial, dial plate and pen being removed. Figure 5 is a front view of the dial, dial plate and pen with which the device shown in Figure 4 is provided. Figure 6 is a front view of an embodiment wherein the flow through a steam or gas flow meter is registered on a counting mechanism. Figure 7 is a fragmentary vertical section corresponding to Figure 6. Figure 8 is a diagrammatic front elevation showing in detail the relation of the clock, ratchet, counter and cam shown in Figures 6 and 7. Figure 9 is a perspective view of one form of counting mechanism which may be used. Figure 10 is an elevation of a preferred mechanism whereby the clockwork is caused to actuate an arm upon which the operation of the device depends. Figure 11 is a fragmentary front elevation of the dial.

Similar reference characters indicate like parts.

Referring to Figures 1 and 2, the liquid that enters the upper chamber 1 of a tank 2 through a pipe or conduit 3 from any suitable source flows over a weir 4 and is discharged into the lower chamber 5, from which it passes away through the conduit 6. A notch or orifice may of course be substituted for the weir. The upper chamber is provided with a float compartment 8 to which the liquid finds access through the openings 9. A float 10, to the rod 11 of which is attached a flexible connector 12, is counterbalanced by a weight 13, and by the medium of the drum 14, imparts angular movement to the shaft 15 corresponding to the variations in depth of the liquid in the upper chamber.

The shaft 15 is journaled in a frame 18 carried by the base 19, and has rigid therewith a cam 20 cut to correspond to the actual amount of liquid that passes the weir or notch 4 at the different depths. It will be seen that the cam turns clockwise from the initial position (Fig. 1) as the liquid rises in the upper chamber. Also journaled in the frame 18 at a point above the shaft 15 is a shaft 22, on which a cam-striking arm 23 is loosely mounted, said arm preferably including a roller 24 by which friction upon the cam is lessened. A spring 25, anchored at 26, normally holds the arm in engagement with a suitable stop 28, the latter being so located that when the cam is in the initial position shown no movement can be given the arm 23 in either direction.

Rigid with the shaft 22 is the ratchet wheel or disk 30, and loosely mounted on the shaft is the lever rocking arm 31 integral with the cam-striking arm 23, and the arm 31 is adapted to impart counterclockwise step-by-step movement to the wheel 30 by means of the roller 32 and inclined face 33. The arm, of course, turns freely about the wheel in the opposite direction. As is obvious, various other types of ratchets may be used. Any counterclockwise movement of the shaft 22 is transmitted in the reverse direction by reducing gears 34 and 35 to the pen shaft 36 and pen 38, the latter of which sweeps across a chart 39 (Fig. 11) on an arc passing through the center thereof. The chart is attached to a dial 40 that is preferably rotated in a counterclockwise direction by a time controlled mechanism 41 of any desired construction; and the same mechanism elevates at predetermined intervals (say each minute) a lever 42 from which the lever 31, including the cam-striking arm 23, is actuated by the spring link 43, that affords the resiliency necessary to compensate for the varying throw of the arm 23 against the cam—putting it another way, the time controlled mechanism at predetermined intervals draws the arm 23 counterclockwise (Fig. 1) from the stop 28 until it strikes the particular portion of the surface of the cam 20 which is then presented toward it.

Any desired mechanism may be employed for swinging the lever 42, but that shown in Figure 10 is deemed preferable. As indicated therein, the minute hand shaft 50 of the mechanism 41 has attached thereto a cam 51 upon which the lever 42 rests, the latter being pivoted at 52. This construction is both cheap and reliable.

From the foregoing, it will be seen that any suitable movement of the arm 23 (and of the pen) is proportional to the rate of flow of the liquid at that instant; that the successive movements added together are proportional to the total flow for the period; and that the pen will scribe on the chart, when the latter is drawn to the proper scale, a spiral-like curve 53 (Fig. 11) the radial distance of any point of which from the origin is expressive of the total flow. It will also be apparent that the inclination of the curve at any point in respect to the corresponding radius of the chart, is a measure of the rate of flow at the particular instant.

The present invention may also be applied to a steam or gas flow meter in the manner shown in Figures 4 and 5, in which 60 indicates a well known type of meter having a pointer 61 secured to a shaft 62 and arranged to sweep in clockwise direction over a dial 63 calibrated in accordance with the rate of flow through the meter. A cam 20 similar to that previously described is rigid with the shaft 62 and limits the throw of a bell crank 64 about the pivot 65. As before, a spring 66 normally holds the cam-striking arm of the bell crank in initial position, and the latter is swung against the cam at intervals by the intermittently actuated arm 68 of a time controlled device 69 through the medium of the spring 70 and link 71.

Loosely mounted on a shaft 72 and pivotally connected to the link 71 is a ratchet lever 73 from which motion is communicated by a roller 74 to the ratchet disk 75 in the manner heretofore described. A train of reduction gearing 76—78 transmits this movement in clockwise direction to the pen shaft 79 and pen 80 (Fig. 5) by which the recording curve is drawn on the chart 81, it being understood that the latter is rotated by the main shaft 82 of the time mechanism. Both meter and recording device may be mounted in a single case 83 of suitable form.

In the embodiment shown in Figures 6, 7, 8 and 9, the invention is again applied to a steam or gas meter 60, a counter being used in lieu of the pen and chart. The intermittently actuated arm 68 of the clock 69, in this instance, acting on the spring 70 swings the arm 85, shaft 86, cam-striking arm 87 and ratchet arm 88 (the two last mentioned members preferably being integral) in counterclockwise direction against the tension of the spring 89, that normally holds the arm 87 in engagement with the stop 90. This movement is transmitted by means of the roller or ball 91 to the ratchet disk 92, the latter being secured to the unit shaft 93 of the counter 94, of any desired form (Figure 9), the numerals being readable through small holes in the front plate 95 (Figure 6). A dial 97 is calibrated in accordance with the varying movement imparted to the pointer 98 at the different rates of flow of fluid, and the pointer shaft 99 bears the cam 100 cut in accordance with the said varying movement, whereby the angular throw of the arm 87 is made to correspond to the rate indication of the pointer, or in other words, to the actual rate of flow through the meter at all times. The summation of the successive movements of the arm 87 is of course directly readable from the counter at any time.

The words "exhibited" and "exhibiting" as used in the claims, are intended to be the equivalent respectively of "recorded, registered or indicated" and "recording, registering, or indicating."

It is clear that many changes in the construction without departing from the spirit of my invention may be made. I do not, therefore, wish to be limited otherwise than as indicated by the subjoined claims.

It is of importance in connection with my device to know that all movements in the cam striking arm 87 must be accurately controlled, in some applications by very delicate force. Simplicity of design is therefore of great value in reducing friction and lost motion.

It may be observed that the relative position and design of the cam striking arm and cam permit an intermittent contact of the said arm with cam 100, without causing a displacement of the cam, due to reaction from a contact of sufficient force to cause registration of the result. In the preferred design this principle is accomplished by designing the contact portions of arm and cam to operate in the same plane. The cam striking arm 87 is loosely supported at a point which permits the contact point thereof, represented by roller 24, to operate in an arc, which will pass approximately through the center of cam support set 99.

By this simple construction, arm 87 contacts with cam 100, always at an approximate tangent of the surface of the cam. This construction results in practically no displacement, and therefore dispenses with the necessity of a locking device or other control for preventing false registration, due to this cause.

It is also important to note that the operation of the arm which contacts with movable cam at predetermined intervals is of a momentary character. That is to say, it does not contact with the edge of the cam a sufficiently long time to result in blocking the action of the cam, or to permit the cam by moving during the time of contact to make a false registration through the arm. Momentary contact at predetermined intervals is accomplished in the preferred design by obtaining only one cam contact per revolution of cam 51 mounted on minute hand shaft 50. This construction, it will be observed, permits a relatively long rest period for lever 42. Arm 23 in turn has a rest period relatively longer than lever 42 because spring link 43 must first overcome the initial tension in spring 25 before lever 42 can be moved from initial position. Upon returning to initial position, the spring action is reversed, causing arm 23 to return to stop 28 before lever 42 has returned to rest position. The initial tension in spring 25 is necessary to normally hold arm 23 against stop 28. As the speed of minute hand shaft 50 is constant, arm 23 is by this mechanism permitted to remain at rest while minute hand shaft 50 is turning through the major portion of any one revolution and moved to and from initial position during the relatively short time remaining to complete this revolution. Since minute hand shaft 50 is time controlled, arm 23 is held in initial position the majority of the time, the period of contact being relatively very small. To make the period of cam contact momentary at predetermined intervals, that is, short enough to produce no appreciable error during the period of contact, the time for revolving minute hand shaft 50 should bear a direct relation to the frequency of rate fluctuation of shafts 15 or shaft 99. The predetermined interval suggested in this mechanism is one minute.

It may also be observed that it is impossible to obtain momentary contact of arm 23 at predetermined intervals from a continuously moving element 50 unless means for holding the arm in initial position during the majority of the time is provided, because both contacts not predetermined may otherwise be transmitted to cam striking arm, particularly when cam 20 is operating at low rates of flow. This means in the preferred design is disassociated from the continuously moved member to overcome the restrictions imposed by the critical angle of the cam 51, when operated by the limited power available, such as a clock spring, because the segment of arc causing actual movement of arm 23 into momentary contact is so small, that if the entire movement were left to cam 51 alone, the angle of rise would be so nearly vertical as to seriously block the cam action. Precise control of the contact arm is much improved by the elimination of the friction and lost motion, due to the extra parts of a locking device which is unnecessary in this construction. It is further improved by removing wearing parts from immediate contact with arm 23, thereby insuring full return to initial position.

The structure of one spring pulling against the other results in the arm being brought against the cam without a forceful blow to break the force of any blow which the arm may make in returning to its stop. Accurate movement of the registering device is improved by holding the arm at rest between movements into momentary cam contact by a stationary support detached from all moving parts.

This construction permits the pressure controlled cam to move at all times thereby eliminating registration errors due to the use of a locking device as used in previous designs. False movements may be transmitted to the pressure cam by the mechanism responsive to rate of flow and movable with the cam, when the cam is locked for the period of arm movement into cam contact, because rate of flow indications may change during this period. When flow indications do change, the mechanism responsive to rate of flow, usually a float, will not be in equilibrium. Upon release of locking device, the momentum of this mechanism will carry it past the normal rate position indicated at time of release. These undesired movements are eliminated when the necessity for locking the cam has been removed.

Thus it is that my device provides for the opposite of any structure wherein the rate of flow cam carries the registering arm in contact except during the intervals when the measurement is taken of cam position, and it is a great improvement over the device in which the arm is under control of a constantly moving part, such as a time driven cam limited in its movement by a rate of flow cam, so located and shaped that the locking device is necessary to prevent false registrations.

By initial position in the claims that follow, I refer to that position of the cam striking arm which it assumes when under the influence of a zero condition of whatever instrumentality it is measuring.

Having thus described my invention, what I claim as new and desire to secure by Letters Patent, is:—

1. In combination with an instrumentality concerning which information is desired and a member movable at all times as a given condition of the instrumentality changes, a cam operatively connected with and movable with the member, said cam being shaped in accordance with the value of the condition of the different points in the movement of the member, a second member movable at predetermined intervals from a normal definite stopped initial position into engagement with the cam, a movable member of an exhibiting device, means for retaining the second member in said definite stopped initial position, and means for imparting to the said movable member of the exhibiting device, a movement representative of the summation of the several movements of the second member, whereby the summation of the condition may be exhibited, said second member having means for actuating it at timed intervals, said means adapted to stand at rest with relation to the second member except at the said intervals, whereby a momentary cam contact may be provided.

2. In combination with an instrumentality concerning which information is desired and a member movable at all times as a given condition of the instrumentality changes, a cam operatively connected with and movable with the member, said cam being shaped in accordance with the value of the condition at the different points in the movement of the member, a second member movable at predetermined intervals from an initial position into engagement with the cam, a movable member of an exhibiting device, and means for imparting to the last mentioned movable member a movement representative of the summation of the several movements of the second member, whereby the summation of the condition may be exhibited, a stop for said second member, a spring to hold it against said stop to positively define said initial position, and an actuating device spring-connected to said member and means for moving the device at timed intervals to draw the member into engagement with said cam, and to release said member the remainder of the time.

3. In combination with an instrumentality concerning which information is desired, a rotatable shaft, and means for rotating the shaft as a given condition of the instrumentality changes, a cam operatively connected with and movable at all times with the shaft, said cam being shaped in accordance with the value of the condition at the different points in the movement of the shaft, a member, means for moving said member at predetermined intervals from a normal definitely stopped initial position into engagement with the cam and means for releasably retaining said member in said normal position, an exhibiting device, having a movable member, and means for imparting to the last mentioned movable member a movement representative of the summation of the several movements of the member, that moves at intervals, whereby the summation of the condition may be exhibited, and mounting means for said cam, and the member that engages the cam, adapted to enforce a movement of said member in substantially the plane of the cam.

4. In combination with an instrumentality concerning which information is desired, a rotatable shaft, and means for rotating the shaft as a given condition of the instrumentality changes, a cam operatively connected with and movable at all times with the shaft, said cam being shaped in accordance with the value of the condition at the different points in the movement of the shaft, a second shaft, a cam-striking arm loosely secured to the second shaft, means for moving the cam-striking arm at predetermined intervals from a normal definitely stopped initial position into engagement momentarily with the cam, the amount of the several movements being determined by the cam, and means for releasably retaining said member in said normal position, an exhibiting device having a movable member, means for imparting to the last mentioned movable member a movement representative of the summation of the several movements of the intermittently movable member, whereby the summation of the condition may be exhibited, and means for rendering the movement of the exhibiting member intelligible, said means for moving the cam-striking arm comprising a continuously moved member, and an energizing member for the cam-striking arm, said energizing member being operatively dis-associated from the continuously moved member except at predetermined intervals.

5. In combination with an instrumentality concerning which information is desired, a rotatable shaft, and means for rotating the shaft as a given condition of the instrumentality changes, a cam operatively connected with and movable at all times with the shaft, said cam being shaped in accordance with the value of the condition at the different points in the movement of the shaft, a second shaft, a cam-striking arm loosely secured to the second shaft, means for positively moving the cam-striking arm at predetermined intervals into engagement momentarily with the cam, means for withdrawing the arm from said contact, the amount of the several movements being determined by the cam, an exhibiting device having a movable member, ratchet means for imparting to the last mentioned movable member a movement representative of the summation of the several movements of the intermittently movable member, whereby the summation of the condition may be exhibited, and means for rendering the movement of the exhibiting member intelligible, said means for moving the cam-striking arm comprising a continuously moved member, and an energizing member for the cam-striking arm, said energizing member being operatively dis-associated from the continuously moved member except at predetermined intervals.

6. A fluid flow meter comprising a shaft movable in response to the changes of rates of flow of the fluid, a cam operatively connected with and movable at all times with the shaft, said cam being shaped in accordance with the amount of fluid passing the meter at the different positions of the fluid responsive shaft, a pivoted striking arm and time controlled means for swinging the arm from a normal definitely stopped initial position in which it is out of engagement except at zero position with the cam to a position in which it is in engagement with said cam at predetermined intervals, and means for withdrawing the arm to a definitely stopped position, whereby a series of forward-and-back movements is imparted thereto corresponding to the rates of flow of fluid at the particular instants, and means for determining the summation of the several movements, said time controlled means having a continuously rotated member, a member directly operating the striking arm, and intermittently operative mechanism intermediate said two members of the time controlled means.

7. In combination with an instrumentality concerning which information is desired and a member movable as a given condition of the instrumentality changes, a cam operatively connected with and movable at all times with the member, said cam being shaped in accordance with the value of the condition at the different points in the movement of the member, a second member movable at predetermined intervals from a normal definitely stopped initial position into engagement momentarily with the cam, and means for so moving said second member and means for so holding it in normal position, the amount of the several movements being determined by the cam, an exhibiting device having a movable member, and means for imparting to the last mentioned movable member a movement representative of the summation of the several movements of the second member, whereby the summation of the condition may be exhibited.

8. A fluid flow meter comprising a shaft movable in response to the changes of flow of the fluid, a cam operatively connected with and movable with the shaft, said cam being shaped in accordance with the amount of fluid passing the meter at the different positions of the fluid responsive shaft, a second shaft, a cam striking arm loosely mounted thereon, a spring normally holding the arm at an angle corresponding to position of engagement with the cam, when said cam is at zero flow position, a ratchet wheel fixedly mounted on the shaft, time controlled means for causing the cam-striking arm to move at intervals into engagement with the cam, means for imparting to the ratchet wheel a movement corresponding to the summation of the individual movements of the cam-striking arm, and means operated by the movement of the ratchet wheel to express the quantity of fluid that has passed the meter.

9. In combination with an instrumentality concerning which information is desired and a member movable as a given condition of the instrumentality changes, a cam operatively connected with and movable at all times with the member, said cam being shaped in accordance with the value of the condition at the different points in the movement of the member, said cam also being shaped and positioned to permit intermittent contact of a second member without displacement by said second member, a second member, means for moving it at predetermined intervals from a normal definitely stopped initial position into engagement with the cam, means for withdrawing the second member from such engagement, a movable member of an exhibiting device, and means for imparting to the last mentioned movable member a movement representative of the summation of the several movements of the second member, whereby the summation of the condition may be exhibited.

10. In combination with an instrumentality concerning which information is desired, a rotatable shaft, and means for rotating the shaft, as a given condition, of the instrumentality changes, a cam operatively connected with and movable with the shaft, said cam being shaped in accordance with the value of the condition at the different points in the movement of the shaft, said cam also being shaped and positioned to permit intermittent contact of a second member without displacement by said second member, a second member, means for moving it at predetermined intervals from normal definitely stopped initial position into engagement with the cam, an exhibiting device having a movable member, and means for imparting to the last mentioned movable member a movement representative of the summation of the several movements of the said second movable member, whereby the summation of the condition may be exhibited.

11. In combination with an instrumentality concerning which information is desired, a rotatable shaft, and means for rotating the shaft at all times as a given condition of the instrumentality changes, a cam operatively connected with and movable at all times with the shaft, said cam being shaped in accordance with the value of the condition at the different points in the movement of the shaft, a second shaft in the same plane as the above mentioned rotatable shaft, an arm provided with a cam-striking member loosely mounted on said second shaft and positioned to contact with said cam, a ratchet wheel movable with the shaft last mentioned, and operated by said striking member, intermittently operated time controlled means permitting the cam-striking arm to be held at rest in a normal definitely stopped position and moving the cam-striking arm at predetermined intervals into engagement momentarily with the same, the rest periods being longer than the moving periods of said arm, and means for imparting to the ratchet wheel a movement corresponding to the summation of the individual movements of the cam-striking arm, whereby the summation of a condition may be exhibited.

FRANK L. MARTINDALE.